UNITED STATES PATENT OFFICE.

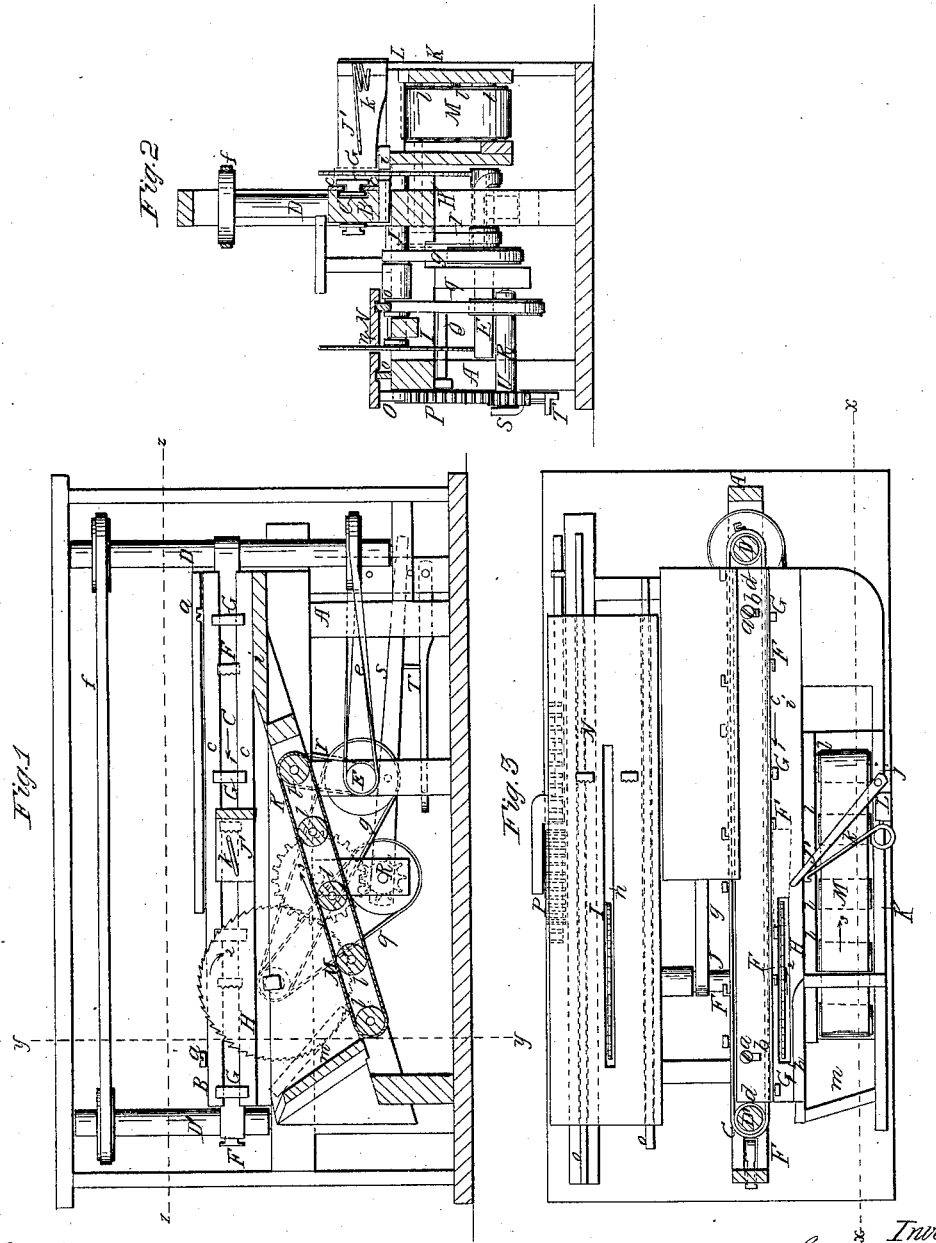

SMITH HEAD, OF MILLERSBURG, PENNSYLVANIA, ASSIGNOR TO HIMSELF AND WM. McKISSICK, OF SAME PLACE.

IMPROVEMENT IN SHINGLE-MACHINES.

Specification forming part of Letters Patent No. 35,974, dated July 22, 1862.

*To all whom it may concern:*

Be it known that I, SMITH HEAD, of Millersburg, in the county of Dauphin and State of Pennsylvania, have invented a new and Improved Shingle-Machine; and I do hereby declare that the following is a full, clear, and exact description of the same, reference being had to the accompanying drawings, making a part of this specification, in which—

Figure 1 is a side sectional view of my invention, taken in the line $x\,x$, Fig. 3. Fig. 2 is a transverse vertical section of the same, taken in the line $y\,y$, Fig. 1. Fig. 3 is a horizontal section of the same, taken in the line $z\,z$, Fig. 1.

Similars letters of reference indicate corresponding parts in the several figures.

This invention relates to an improved shingle-machine of that class in which saws are employed for cutting the shingles from the bolt.

The object of the invention is to obtain a machine of the class specified, which will admit of the bolts being fed to the saw by a continuous movement and render the same capable of performing its work very expeditiously.

The invention also has for its object the facilitating of the handling of the bolt in applying the same to the machine, so as to cut the shingle's butt and point alternately from each end of the bolts.

The invention has further for its object the applying of a dressing or roughing-off saw to the machine in such a manner that the bolts may be dressed or sawed in proper form for the machine and be operated from the driving-shaft thereof, and also rendered inoperative, when desired, by a simple treadle-and-gear mechanism.

To enable those skilled in the art to fully understand and construct my invention, I will proceed to describe it.

A represents the framing of the machine, which may be constructed in any proper way to support the working parts of the machine.

B is a bed-piece, which is secured horizontally and longitudinally in the framing A by bolts $a\,a$, which pass vertically through oblong slots $b\,b$ in the bed-piece, said slots $b$ having a transverse position in the bed-piece and admitting of the latter being adjusted laterally a requisite distance, as will be fully understood by referring to Fig. 3. The bed-piece B is provided at one side with two metal strips, $c\,c$, one at the top and the other at the bottom, and those strips serve as guides for an endless belt, C, which passes around pulleys $d\,d$ on vertical shafts D D′, placed in the framing, one at each end of the bed-piece B. These shafts D D′ have a rotary movement given them from a driving-shaft, E, by means of a belt, $e$, which passes around a pulley on the lower part of one of the shafts D, and motion is communicated to the other one, D′, from D by means of a belt, $f$, which passes around suitable pulleys at their upper parts, as shown in Fig. 1.

To the side of the belt C there are secured at a suitable distance apart dogs F, which project through the space between the guides $c\,c$, and have notched or serrated edges, as shown clearly in Fig. 1. To the belt C there are also attached at a suitable distance apart a series of bars, G, which serve as bearing-surfaces for the bolts, there being a bar, G, in front of each dog F, as shown in Figs. 1 and 3.

H I are two circular saws, which are placed on a horizontal shaft, J, in the framing A, said shaft being operated by a belt, $g$, from the driving-shaft E. The saw H is the one which cuts the shingles from the bolts, and it is placed in quite close proximity to the bed-piece B, as shown in Fig. 3. The saw H passes through and works in a cut or kerf, $h$, in a platform, $i$, on the framing A, said platform serving as a support for the bolts as they are fed to saw H.

J′ is a pressure-plate the outer part of which is attached by a vertical pivot, $j$, to the outer and upper part of a box, K, connected with the framing, and this plate has a spring, $k$, acting or bearing against it, as shown in Figs. 2 and 3, said spring being attached to the upper part of an upright, L. The box K has an inclined endless apron, M, for its bottom. This apron works over suitable rollers, $l$, and its highest end is at the front or feed end of the machine. (See Fig. 1.) The back end, $m$, of the box K is inclined, the upper end of said back being farther out or nearer the back or discharge end of the machine than its lower end, as shown in Fig. 1.

The saw I is the one used for dressing the bolts preparatory to sawing them into shingles. This saw works in a slot or kerf, n, in a movable bed, N, which is fitted horizontally in the framing A, on suitable ways, o o. To the outer edge of this bed N there is attached a rack, O, into which a pinion, P, on a shaft, Q, gears. The outer end of shaft Q has its bearing in the end of a lever, S, to which a treadle, T, is attached. The shaft R has a pinion, U, upon it, which, when the lever S is adjusted through the medium of the treadle T, gears into the pinion P. When the treadle T is relieved from the pressure of the foot of the operator, the outer part of shaft R will drop by its own gravity and the pinion U will leave the pinion P. The shaft R is driven by a belt, q, from the saw-shaft J, and the endless apron M is driven from shaft E by a belt, r.

The operation of the machine is as follows: The shaft E is rotated by any convenient power, and the endless belt C is moved in the direction indicated by arrows 1, the saws H I rotated in the direction indicated by arrow 2, and the endless apron M of box K moved in the direction indicated by arrow 3. The rough bolts are dressed by the saw I, the operator depressing treadle T, and thereby turning pinion U in gear with pinion P, which, in consequence of working in the rack O of the bed N, moves the bed N, with the rough bolts attached, to the saw I. When the bed N arrives at the end of its feed movement, the operator releases the treadle T, and the pinion U drops out of gear with pinion P, and the bed N is drawn back by hand to its original position ready for the reception of other rough bolts and a succeeding feed movement toward the saw I. The dressing of the bolts may be superintended by one operator, and the sawing of the bolts into shingles may be superintended by another one. The operator who attends the sawing of the dressed bolts into shingles stands at the front end of the machine and adjusts them to the belt C, placing a bolt between each dog F and the bar G, immediately in front of it, the lower edges of the bolts resting on the platform i. The belt C feeds the bolts to the saw H, which cuts a shingle from the inner side of each next to the belt, a taper form being given each shingle by adjusting the bed-piece B slightly out of parallel with the cutting plane of the saw, and the thickness of the shingles may be graduated as desired by adjusting the bed-piece B nearer to or farther from the saw H. The pressure-plate J keeps the bolts in close contact with the belt C and guides c c while being acted upon by saw H. The bolts are acted upon consecutively by the saw H, and as each shingle is sawed off from them it is discharged from the back end of the platform i, the passage of the bars G and dogs F around the pulley of the back shaft, D', serving to liberate the shingles from belt C. Each bolt after having a shingle sawed from it falls into the box K and strikes against the back m of said box, which back in consequence of being inclined throws forward the lower end of the bolt, so that the endless apron M will carry the bolts up to the front end of the machine in a position reverse to that in which they were previously fed to the saw H, and the operator or attendant adjusts the bolts to the belt C in the same position that they are fed back to him from saw H. The bolts therefore, it will be seen, have the shingles sawed from them butt and point alternately from each end, and the reversing of the bolts in their movement back to the operator or attendant saves the operator considerable trouble and time.

Having thus described my invention, what I claim as new, and desire to secure by Letters Patent, is—

1. The endless belt C, provided with the dogs F and bars G, and fitted to the adjustable bed-piece B, as shown, and used in connection with the saw H, to operate as and for the purpose set forth.

2. The box K, provided with the endless apron M and inclined back m, in combination with the saw H and endless bolt-feeding belt C, all arranged for joint operation, as and for the purpose herein specified.

3. The combination of the bolt-dressing saw I with the shingle-saw H, when the former is provided with a feeding-bed, N, operated through the medium of the rack O and pinions P U, the latter being on an adjustable shaft, R, connected with a lever, S, having a treadle, T, attached and arranged as shown, whereby the bed N may be operated at the will of the attendant from the driving-shaft E, having a constant motion.

SMITH HEAD.

Witnesses:
  A. E. FREEBURN,
  S. P. AUCHAMTZ.